Patented Dec. 16, 1947

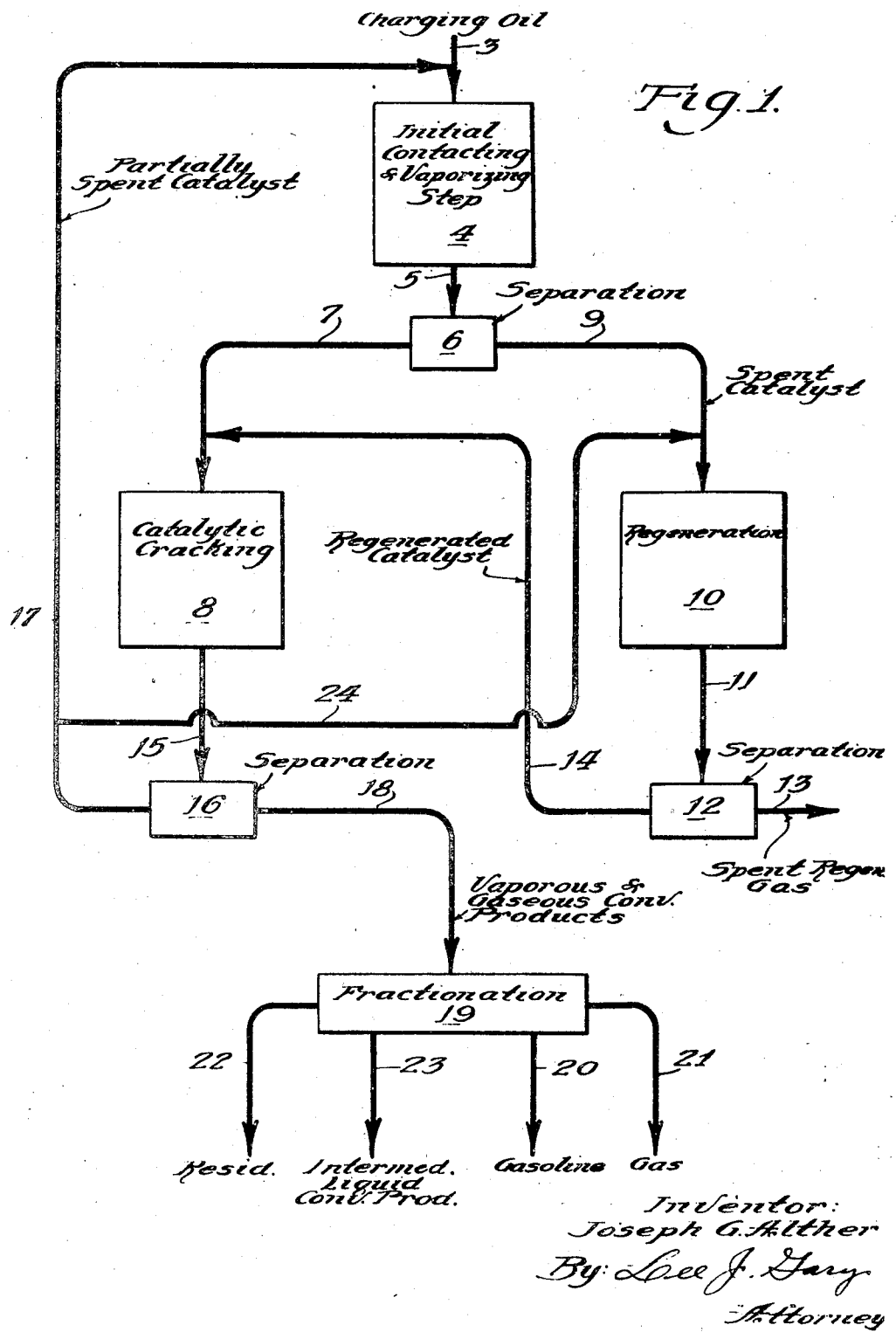

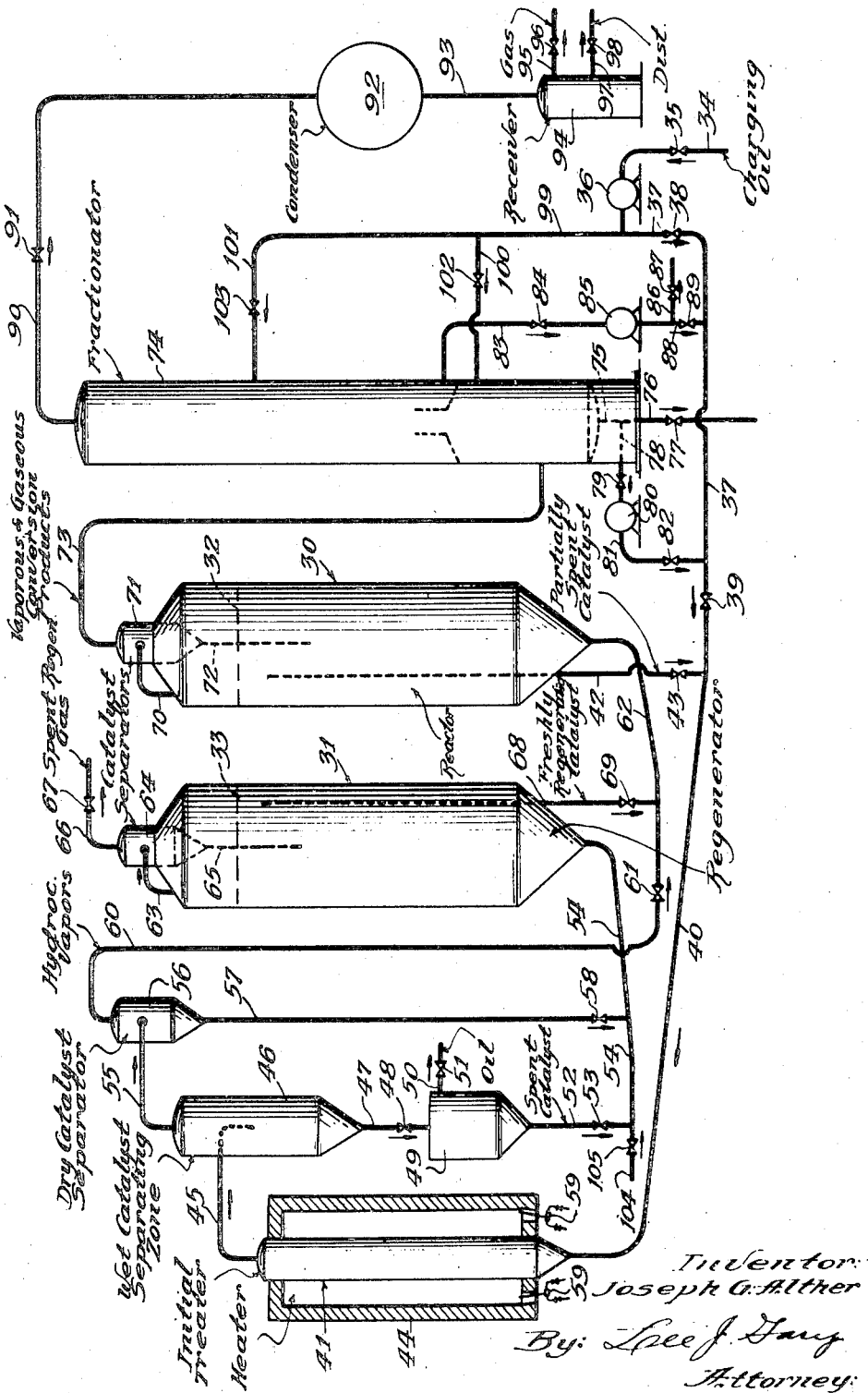

2,432,644

UNITED STATES PATENT OFFICE 2,432,644

CATALYTIC CONVERSION OF HYDROCARBONS

Joseph G. Alther, Chicago, Ill., assignor to Universal Oil Products Company, Chicago, Ill., a corporation of Delaware Application July 31, 1943, Serial No. 496,855

4 Claims. (Cl. 196—49)

1

The invention relates to an improved process for the catalytic conversion of hydrocarbons involving an initial step in which the hydrocarbon charge is contacted with previously used or partially spent subdivided solid cracking catalyst and a subsequent step in which the resulting products of the initial step are catalytically cracked in the presence of fresh or freshly regenerated subdivided solid cracking catalyst.

The initial step of the process in which the charging oil is contacted with partially spent catalyst may be employed to perform one or more of several functions. Partially spent catalyst is supplied to this step from the subsequent cracking step at or close to the relatively high temperature prevailing in the latter and furnishes a substantial portion or all of the heat required to vaporize the normally liquid charging oil by its contact therewith in the initial step. The conditions of operation employed in the initial step result in relatively mild cracking of the charging oil and this step serves as a means of eliminating from the resulting oil vapors supplied to the subsequent more severe cracking operation any heavy components of the initial charging oil which are not vaporized in the initial step and are not suitable for the subsequent catalytic cracking treatment. This elimination results from the accumulation of said heavy components of the charge or heavy conversion products thereof as a deposit on the catalyst in the initial step, the resulting contaminated catalyst being separated from the vaporized products prior to supplying the latter to the subsequent cracking step.

The initial step of the process is also advantageous as applied to the treatment of charging oils containing deleterious materials, such as sulfur compounds and/or nitrogen bases for example, which would adversely affect the desired cracking reaction in the subsequent step or poison the catalyst or which would contaminate the desired final product.

The catalyst employed in the initial step, even though it has been previously used and is partially spent, is sufficiently active under the operating conditions employed to release all or a substantial portion of the aforementioned deleterious materials from the charging oil in the form of deposits on the catalyst and/or unobjectionable or less objectionable volatiles. For example, certain nitrogen bases may be adsorbed on the catalyst and burned therefrom in the subsequent regenerating step while others may be decomposed in the presence of catalyst to form nitrogen or ammonia and olefins which may be

2 cracked or polymerized to form combustible catalyst deposits. Thus by separating the resulting contaminated catalyst from the oil vapors and regenerating the catalyst before it is employed to crack the oil vapors, said deleterious nitrogen bases are eliminated from the cracking step to which the oil vapors are supplied. The relatively small amounts of nitrogen and/or ammonia formed in the initial step and carried with the oil vapors to the subsequent cracking step will not deleteriously affect the cracking reaction or poison the regenerated catalyst.

As applied to sulfur-bearing oils, hydrogen sulfide for example is released in the initial step of the process but is not particularly detrimental to the subsequent cracking reaction and may be readily separated from the final gasoline product. The release of hydrogen sulfide will leave combustible catalyst deposits which are eliminated in the regenerating step. With oils containing both nitrogen bases and sulfur compounds, mercaptan sulfur, which is particularly objectionable in the gasoline produced, may be combined in the initial step of the process with nitrogen or ammonia released from the nitrogen bases to form combustible catalyst deposits which are eliminated in the regenerating step.

It will thus be apparent that, by virtue of the initial conversion or treating step of the process followed by separation and regeneration of contaminated catalyst before it is employed in the subsequent cracking step, I may utilize heavier charging oils which normally give excessive catalyst deposits in catalytic cracking and may also utilize low-grade charging oils containing objectionable nitrogen bases or sulfur compounds and which are not suitable as charging stock for conventional catalytic cracking operations. The process even permits the use of low-grade oils such as is obtained from oil shale.

The contaminated catalyst from the initial step of the process is supplied to a regenerating zone in which the contaminating substances are removed from the catalyst particles by oxidation or burning in the presence of air or other oxidizing gas under temperature conditions controlled to prevent damage to the catalyst particles, thus restoring their catalytic activity. The resulting regenerated catalyst is supplied to the second conversion step of the system in which it contacts the oil vapors from the initial step and in which catalytic cracking of the latter is effected to produce substantial yields of aviation base or motor gasoline. Resulting partially spent catalyst is then supplied, all or in part, from the last-mentioned conversion step to the initial step of the process for treatment of the charging oil as above described.

Any of the several cracking catalysts comprising composites of silica with one or more metal oxides such as alumina, zirconia, magnesia and the like are suitable for use in the present process, although they are, of course, not all equivalent in their activity or efficiency in either of the conversion steps of the system. The cracking catalyst employed may be a natural clay or other alumino silicate of suitable composition or an acid-treated natural clay or the like, fortified, when desired, by the addition thereto of one or more of the aforementioned metal oxides after acid treatment, or it may be an entirely synthetic catalyst prepared by the precipitation of silica from a metal silicate solution, for example, and by precipitation of the metal oxide or oxides employed from solutions of their salts or other suitable compounds thereof. Such catalysts and numerous methods of preparing the same are now well known in the art and the exact composition of the catalyst employed, and its method of preparation are not considered either essential or novel features of the invention, and need not be here described in detail. In the preferred embodiment of the invention, however, the catalyst employed is one which will withstand repeated regeneration without excessive or rapid loss of activity, and this is generally accomplished in the class of catalysts above mentioned by the substantial elimination of alkali metal compounds therefrom at some stage in their preparation. The catalyst employed is in the form of subdivided solid particles which are calcined prior to their use to eliminate any excessive moisture content.

The invention will be further explained in conjunction with the accompanying drawing of which Figure 1 is a flow diagram illustrating the process and Figure 2 is a diagrammatic illustration of one of the several specific forms of apparatus suitable for conducting the process.

Referring now to Figure 1, the charging oil is supplied preferably in liquid state through line 3 to the initial contacting and vaporizing step 4 in which it is intimately contacted with relatively hot catalyst supplied thereto from the subsequent conversion step, as will be later described. The charging oil is heated in zone 4 by its contact with the catalyst and any required additional heat for substantially vaporizing the oil and/or for obtaining a desired operating temperature in zone 4 may be supplied thereto as preheat in the initial charging oil, or by external heating of the conversion zone or in any other convenient manner not illustrated.

The catalyst particles supplied to zone 4 become contaminated, under the operating conditions employed therein, with deposits of heavy combustible conversion products which, with a high boiling charging oil, comprise or result from conversion of high boiling hydrocarbons in the charge and, in the case of oils containing deleterious sulfur compounds, nitrogen bases or the like, may also comprise sulfur or nitrogen compounds or heavy products resulting from the conversion of such materials in zone 4.

In any case, components of the charging oil suitable for conversion to the desired gasoline product in the subsequent catalytic cracking step of the system are removed as vapors from zone 4 and are directed with contaminated catalyst particles from zone 4 through line 5 to separating zone 6.

In zone 6 all of a major portion of the contaminated catalyst particles supplied thereto are separated from the relatively clean and uncontaminated vapors, the latter being directed from zone 6 through line 7 to further treatment in the second conversion step of the process, indicated at 8, while the contaminated catalyst particles are directed from separating zone 6 through line 9 to the regenerating step 10.

In the regenerating step, the contaminated catalyst particles supplied to this zone are contacted with air or other suitable oxidizing gas at a sufficiently high temperature to effect regeneration of the catalyst and restoration of its activity for promoting the cracking action by the oxidation or burning of combustible contaminates therefrom. The temperature in the regenerating step is controlled by any convenient well known means not illustrated to prevent overheating of the catalyst particles which would result in destruction or permanent impairment to their activity. Regenerated catalyst and gaseous products of its regeneration are directed from zone 10 through line 11 to separating zone 12 wherefrom the spent or partially spent regenerating gas is removed through line 13 and wherefrom regenerated catalyst separated from the gases is directed through line 14 to the catalytic cracking step in zone 8.

In zone 8 the hydrocarbon vapors from the initial contacting and vaporizing step 4 and the regenerated catalyst from zone 10 are intimately contacted under conditions of temperature, pressure and conversion time regulated to effect substantially catalytic cracking of the hydrocarbons and their conversion into substantial yields of good anti-knock gasoline. The operating conditions may be regulated to effect the production of motor gasolines containing substantial quantities of olefins or for the production of gasoline fractions substantially devoid of olefins or having a sufficiently low olefin content to meet the requirements for aviation base stock. Conditions for producing gasoline of either type with catalysts such as previously specified are now familiar to those conversant with the art and the specific conditions employed are therefore not considered a novel feature of the invention, although an example of suitable operating conditions will be later given.

Deposits of combustible heavy conversion products of a carbonaceous or hydrocarbonaceous nature are accumulated on the catalyst particles in the reaction zone 8 but the extent of these deposits is not sufficient to render the catalyst totally inactive. In accordance with the provisions of the invention it is therefore further utilized, all or in part, in the initial contacting and vaporizing step 4 to effect conversion of the charging oil under milder cracking conditions than those employed in zone 8. The partially spent catalyst is directed with fluid conversion products from zone 8 through line 15 to separating zone 16 wherein all or a major portion of the catalyst particles are separated from the fluid hydrocarbon conversion products and are directed, all or in part, through line 17 to the initial conversion step 4 for treatment of the charging oil in the manner previously described.

When desired, only a regulated portion of the partially spent catalyst is thus supplied to the initial conversion step and the remainder is supplied directly through line 24 to the regenerating step.

Fluid conversion products in the form of vaporous and gaseous hydrocarbons are directed from separating zone 16 through line 18 to fractionating zone 19 wherein they are separated into the desired fractions. The gasoline product of the desired boiling range and vapor pressure is withdrawn from zone 19 through line 20 to storage or to any required further treatment, while lighter normally gaseous fractions are released from zone 19 through line 21. Normally liquid fractions boiling above the range of the desired gasoline product may be withdrawn as a single product from zone 19 or may be further separated therein into any number of selected fractions of narrower boiling range. In the case here illustrated the heaviest components of the nature of residual liquids such as fuel oil or the like are directed from zone 19 through line 22 to storage or elsewhere, as desired, while lighter liquids of the nature of gas oil, kerosene, kerosene distillates, naphtha and the like, are removed from zone 19 through line 23 and all or selected fractions of such material may, when desired, be returned to zone 4 or directly to zone 8 for further treatment to produce additional yields of the desired gasoline product.

Referring now to Figure 2, the system here illustrated employs what is known as the fluid bed type of operation in the catalytic cracking step conducted in reactor 30, which corresponds to zone 8 of Figure 1, and also employs fluid bed operation in the regenerating step conducted in regenerator 31 which corresponds to zone 10 of Figure 1.

In reaction vessel 30, a bed of active cracking catalyst is maintained in fluid-like state by an ascending stream of the hydrocarbon vapors to be cracked and the resulting vaporous and gaseous conversion products. This bed comprises a relatively dense lower phase containing a relatively high concentration of catalyst particles. Above the bed is a materially less dense upper phase containing a substantially lower concentration of catalyst particles, the approximate line of demarkation between the light and dense phases being indicated by the broken line 32.

In regenerating vessel 31 a similar fluid-like bed of the catalyst particles undergoing regeneration is maintained by passing the stream of oxidizing gas, employed for effecting regeneration, and the resulting gaseous products of regeneration upwardly through the bed. The catalyst in regenerator 31 also takes the form of a relatively dense lower phase and a relatively light upper phase, the approximate line of demarkation between the light and dense phases being indicated at 33.

The charging oil for the process is supplied, in the case illustrated in Figure 2, through line 34 and valve 35 to pump 36 wherefrom it may be directed through line 37, valve 38, valve 39 and line 40 to the initial reaction zone or treater indicated at 41. The oil entering line 40 picks up partially spent catalyst which is withdrawn from the dense phase or fluid bed in reactor 30 and directed through standpipe 42 and the adjustable orifice or flow control valve 43 adjacent its lower end into line 40. The mixture of catalyst and hydrocarbons from line 40 pass upwardly through chamber 41 and, in addition to being substantially vaporized in line 40 or in chamber 41, the oil is contacted with the catalyst under relatively mild cracking conditions compared with those prevailing in reactor 30. The relatively hot catalyst from reactor 30 supplies heat to the oil undergoing treatment in chamber 41 and furnishes at least a substantial portion of the heat required for effecting the desired treatment of the oil in this zone. However, provision is made in the case illustrated for supplying additional heat to the reaction taking place in chamber 41 from a suitable furnace structure 44, the vertical walls of which are fired in the case illustrated by means of burners 59.

The fluid conversion products and contaminated catalyst resulting from the treatment afforded the oil in chamber 41 are directed through line 45 to initial separation in chamber 46 wherein a substantial portion of the catalyst particles and any non-vaporous hydrocarbons deposited thereon or associated therewith are separated from hydrocarbon vapors and catalyst particles which remain entrained in the latter. Separated catalyst is directed from the lower poriton of chamber 46 through line 47 and valve 48 to a suitable settling or filter zone 49 wherefrom any liquid oil associated with the catalyst particles may be separated therefrom and withdrawn through line 50 and valve 51. The remaining contaminated catalyst particles are directed from chamber 49 through line 52 and valve 53 to transfer line 54 wherein they are picked up by an incoming stream of air or other oxidizing gas supplied through line 104 and valve 105 and are transported therewith to regenerator 31.

Hydrocarbon vapors and entrained catalyst particles are directed from the upper portion of chamber 46 through line 55 to further separation in a suitable cyclone separator or the like indicated at 56. Here all or a major portion of the entrained catalyst particles are separated from the hydrocarbon vapors and are directed through standpipe 57 and the adjustable orifice or flow control valve 58 adjacent its lower end into transfer line 54 to commingle with the stream of oxidizing gas from line 55 and catalyst particles from chamber 49 with which it is transported to regenerator 31.

The relatively clean hydrocarbon vapors, substantially devoid of undesirable heavy components and other deleterious materials such as sulfur compounds and nitrogen bases removed from the charging oil by the initial conversion step conducted in chamber 41, are directed from separator 56 through line 60 and valve 61 to transfer line 62 and therethrough in reactor 30.

In the regenerator the catalyst particles continuously supplied to this zone as previously described are regenerated by burning contaminants therefrom in the oxidizing gas stream supplied to this zone. The oxidizing gas is supplied to the regenerator in sufficient quantities to maintain the catalyst undergoing regeneration in a fluid-like condition, the net upward velocity of the regenerating gas and resulting gaseous products being greater than that of the catalyst particles so that the phenomenon known as "hindered settling" is obtained. Hindered settling of the catalyst particles is more pronounced in the lower portion than in the extreme upper portion of the regenerator and this results in the two-phase condition previously mentioned. Gaseous products of the regenerating step are directed with entrained catalyst particles from the light upper phase in the regenerator through line 63 to separation in suitable separating equipment, such as, for example, the cyclone separator indicated at 64. Resulting separated catalyst particles are returned from the lower portion of separator 64 through standpipe 65 to the dense phase or fluid bed in the regenerator. The gaseous products of regeneration, from which all or a major portion of the catalyst particles have been removed, are discharged from separator 64 through line 66 and the pressure control valve 67 preferably to suitable heat recovery equipment not illustrated.

A stream or column of regenerated catalyst particles is continuously directed from any suitable point in the dense phase or fluid bed in regenerator 31 through standpipe 68 and the adjustable orifice or flow control valve 69 adjacent its lower end into transfer line 62, wherein the catalyst particles are picked up by the incoming stream of hydrocarbon vapors from line 60 and are transported therein to reactor 30.

The hydrocarbon vapors and resulting vaporous and gaseous conversion products passing upwardly through the catalyst bed in reactor 30 keep the bed in a fluid-like state and their net upward velocity is greater than that of the catalyst particles so that pronounced hindered settling prevails particularly in all but the uppermost region of the reactor and the two-phase condition above mentioned is obtained. The heat contained in the hydrocarbon vapors supplied to reactor 30 and in the hot regenerated catalyst particles supplied to this zone is sufficient to supply the required heat to the cracking reaction and maintain the desired reaction temperature in reactor 30.

A stream or column of partially spent catalyst particles is continuously directed, as previously described, from any suitable point in the dense phase or fluid bed in reactor 30 through standpipe 42 and valve 43 into transfer line 40 for transportation with the charging oil into chamber 41.

Although not illustrated in the drawing, the invention contemplates the use of suitable propulsion or pressure developing means, when desired, such as a pump, for example, in line 40 or a blower or compressor in line 60 and similar means in line 54, when required, to take care of any differential pressure existing between chambers 30, 31 and 41 or to overcome friction and loss of pressure head through the system.

Vaporous and gaseous conversion products and catalyst particles entrained therein are directed from the upper light phase in reactor 30 through line 70 to suitable separating equipment, such as, for example, the cyclone separator indicated at 71. The separated catalyst particles are directed from the lower portion of separator 71 through standpipe 72 into the dense phase or fluid bed in reactor 30.

The vaporous and gaseous conversion products of the cracking reaction conducted in reactor 30 are directed from the upper portion of separator 71 through line 73 into fractionator 74 wherein they are separated into two or more selected fractions of the desired boiling range. In the case illustrated, the heaviest normally liquid components of the conversion products are withdrawn from the lower portion of the fractionator through line 75 and may be directed through line 76 and valve 77 to cooling and storage or elsewhere as desired or they may be supplied, all or in part, via line 78, valve 79, pump 80, line 81 and valve 82 into line 37 and thence through transfer line 40 to further treatment in chamber 41. Lighter normally liquid fractions of the conversion products are condensed from the vapors at a higher point in fractionator 74 and withdrawn therefrom as reflux condensates through line 83 and valve 84 to pump 85 wherefrom they may be supplied through line 86 and valve 87 to cooling and storage or elsewhere as desired, or a portion or all of these intermediate liquid fractions may be supplied through line 88, valve 89 and lines 37 and 40 to further treatment in chamber 41.

Gases and gasoline fractions of the desired end-boiling point are directed from the upper portion of fractionator 74 through line 90 and valve 91 to condensation and cooling in condenser 92 wherefrom the resulting distillate and uncondensed gases are directed through line 93 to collection and separation in receiver 94. The uncondensed gases are directed from the receiver through line 95 and valve 96 to suitable gas concentrating and recovery equipment not illustrated or to storage or elsewhere as desired. Distillate from receiver 94, which is the desired gasoline product of the process, is directed through line 97 and valve 98 to storage or to any further treatment or blending required to form a motor gasoline or an aviation-base gasoline. Regulated quantities of the distillate collected in receiver 94 may be returned by well known means not illustrated to the upper portion of fractionator 74 to serve as a refluxing and cooling medium in this zone.

When desired, instead of supplying all or any portion of the initial charging oil from pump 36 through line 37 to chamber 40, as previously described, it may be directed through line 99 and through one or both of the branch lines 100 and 101 controlled by the respective valves 102 and 103 into fractionator 74 wherein it serves as a cooling and refluxing medium and wherein it may be separated into selected fractions substantially corresponding in boiling range to the selected fractions of the liquid conversion products removed from the fractionator through lines 78 and 88.

Suitable means, not illustrated, are preferably provided for preventing excessive compaction of the catalyst columns in standpipes 42, 47, 62, 57 and 68 and to substantially strip the catalyst of reactive vapors or gases. For example, the catalyst column in standpipe 68 should be substantially stripped of oxidizing and combustion gases before it is supplied to reactor 30 and the catalyst column in standpipes 57 should be substantially stripped of readily vaporizable hydrocarbons before being supplied to regenerator 31. This may be accomplished, for example, by introducing relatively small amounts of steam or other relatively inert gas into the various standpipes at one or a plurality of points on the upstream sides of the adjustable orifices or flow regulating valves provided therein.

Temperature control in the regenerating step to prevent the development of a sufficiently high temperature to cause damage to the catalyst or permanent impairment to its activity may be accomplished in any convenient manner, not illustrated in the drawing. One suitable method is to establish a local cycle of catalyst from the dense phase or fluid bed in the regenerator through a suitable heat exchanger or other form of cooler and thence back into the regenerator.

Although I prefer to employ partially spent catalyst from the cracking step in the initial treating step, the invention is not limited in its broader aspects to this particular feature. Alternatively, a regulated amount of the catalyst from the regenerating step may be supplied to the initial treatment step either alone or in conjunction with the use of partially spent catalyst. When freshly regenerated catalyst is so used in the initial treating step, the quantity necessary to accomplish the desired results in this zone usually is considerably less than the quantity of partly contaminated catalyst which would be required, both because of its higher activity level and its higher temperature. Thus, when relatively high temperatures are desired in the initial treating step, the use of relatively hot freshly regenerated catalyst will usually obviate the necessity for supplying additional heat to the initial treating step. When substantially fresh or freshly regenerated catalyst is employed in the initial treating step, the effluent catalyst from this step is preferably returned to the regenerator and a substantial portion of the regenerated catalyst is supplied to the main cracking reactor, catalyst withdrawn from the main cracking reactor being returned to the regenerating step.

As an example of one specific operation of the process provided by the invention and conducted in a system such as illustrated in Figure 2, the charging oil is a crude petroleum containing sulfur compounds and nitrogen bases. A high proportion of the charging oil comprises gas-oil fractions suitable for relatively deep cracking, but also contains some heavier fractions which are desirably eliminated before its lighter components are supplied to the cracking reactor 30. This elimination of undesirable heavy components, as well as the substantial elimination of the nitrogen bases and sulfur compounds is accomplished by initially contacting the oil in zone 41 with partially spent catalyst from reactor 30.

A temperature of approximately 800° F. and a pressure of approximately 15 pounds gauge is employed in zone 41 and sufficient time is afforded the oil in contact with the catalyst to vaporize substantially all of its desirable gas oil fractions and obtain relatively mild cracking of at least its heavier fractions. This results in the formation of some lighter hydrocarbons which are included with the vapors supplied to the cracking reactor 30, leaving deleterious components of the charging oil as an additional accumulation of heavy combustible deposits on the catalyst particles.

Contaminated catalyst is supplied from the initial treating step to regenerator 31 wherein it is rendered active for promoting the cracking reaction in zone 30 by burning combustible deposits therefrom. The regenerator is operated at a temperature of approximately 1125° F. and a gauge pressure of approximately 8 pounds.

Resulting hot regenerated catalyst is continuously supplied to reactor 30 with the vaporous hydrocarbons from the initial step of the process and the latter are cracked in the reactor at a temperature of approximately 950° F. and a gauge pressure of approximately 5 pounds. A weight hourly space velocity, expressed as pounds of catalyst, per pound of oil passed through reactor 30 per hour, is approximately 1 and the weight ratio of catalyst to oil entering reactor 30 is approximately 12:1.

An operation such as above described will give a yield of debutanized 350° F. end-point gasoline amounting to approximately 32% by volume of the oil charged to the cracking reactor 30. This product has a high octane rating and is suitable for use as aviation base gasoline. In addition, a substantial quantity of C₄ and lighter fractions amounting to some 20 weight percent or more based on the oil supplied to cracking reactor 30 is produced. All but a small percentage of the remaining products, accountable for as catalyst deposits, will be heavier liquid products suitable for further cracking treatment within the same or in a separate system. Recycling of these heavier products as provided by the invention will result in an increased yield of gasoline and gas.

It will, of course, be understood that the invention is not limited to the particular operating conditions and results given in the foregoing example. There is a relatively wide choice of operating conditions which will depend upon the particular characteristics of the oil to be treated and the desired results. For example, the initial stage of the process may be operated at a temperature ranging from 600 to 1000° F., or thereabouts, and at a pressure ranging from sub-atmospheric to several hundred pounds superatmospheric pressure. The subsequent cracking reaction conducted in the presence of the regenerated catalyst may employ a temperature ranging from 700 to 1100° F., or thereabouts, although the preferred range is from 800 to 1000° F. The liquid hourly space velocity employed in this step may range from 0.25 to 10 or more and the catalyst-oil weight ratio may be from 1:1 to as high as 20:1 or more. For most stocks and for the commonly employed refractory oxide cracking catalysts, the space velocity employed is preferably within the range of 0.5 to 5 and the catalyst-oil ratio is preferably within the range of 5:1 to 15:1. The operating pressure employed in reactor 30 is preferably from approximately atmospheric to 50 pounds gauge, or thereabouts, but may, when desired, range from sub-atmospheric to 1000 pounds or more.

I claim as my invention:

1. A catalytic conversion process which comprises passing hydrocarbon vapors upwardly through a relatively dense bed of subdivided solid cracking catalyst maintained at cracking temperature, removing partially spent catalyst particles from said bed and suspending the same in a liquid hydrocarbon charging oil, passing the resultant suspension through a vaporizing zone and therein vaporizing a substantial portion of the charging oil in the presence of the catalyst particles, thereby depositing on the latter heavy non-vaporous components of the charging oil, separating thus contaminated catalyst particles from the charging oil vapors and supplying the latter to said bed of cracking catalyst, suspending the separated contaminated particles in a stream of oxygen-containing gas and introducing the suspension thus formed into the lower portion of a bed of contaminated catalyst particles maintained under combustion conditions whereby to regenerate the catalyst, removing regenerated catalyst particles from the last-named bed and suspending the same in said charging oil vapors being supplied to the first-mentioned bed.

2. A process such as defined in claim 1, wherein said hydrocarbon oil contains sulfur compounds which are released therefrom under the operating conditions employed in the vaporizing zone to form combustible deposits on the catalyst so that said oil vapors separated from the contaminated catalyst are substantially free of deleterious sulfur compounds.

3. A process such as defined in claim 1, wherein said hydrocarbon oil contains deleterious nitrogen bases which are released therefrom under the operating conditions employed in the vaporizing zone to form combustible deposits on the catalyst so that the resulting oil vapors separated from the contaminated catalyst are substantially free of deleterious nitrogen bases.

4. The process as defined in claim 1 further characterized in that the charging oil is mildly cracked in the presence of said partially spent catalyst.

JOSEPH G. ALTHER.

REFERENCES CITED

The following references are of record in the file of this patent:

UNITED STATES PATENTS

| Number | Name | Date |
|---|---|---|
| 2,136,383 | Houdry | Nov. 15, 1938 |
| 2,203,470 | Pier et al. | June 14, 1940 |
| 2,217,703 | Pew, Jr., et al. | Oct. 15, 1940 |
| 2,235,133 | Zimmerman | Mar. 18, 1941 |
| 2,296,722 | Marancik et al. | Sept. 22, 1942 |
| 2,303,076 | Frolich | Nov. 24, 1942 |
| 2,323,899 | Day et al. | July 13, 1943 |
| 2,328,773 | Benedict | Sept. 7, 1943 |
| 2,342,984 | Thomas | Feb. 29, 1944 |
| 2,348,699 | Tuttle | May 9, 1944 |
| 2,378,531 | Becker | June 19, 1945 |

FOREIGN PATENTS

| Number | Country | Date |
|---|---|---|
| 539,383 | Great Britain | Sept. 8, 1941 |
| 543,838 | Great Britain | Mar. 16, 1942 |